(12) United States Patent
Raasakka et al.

(10) Patent No.: US 6,273,501 B1
(45) Date of Patent: Aug. 14, 2001

(54) SIMPLIFIED WIND DEFLECTOR FOR VEHICLE ROOF CLOSURE

(75) Inventors: John Raasakka, Howell; John E. Long, Highland; Roch Tolinski, Howell, all of MI (US)

(73) Assignee: Meritor Light Vehicle Systems, Inc., Troy, MI (US)

( * ) Notice: Subject to any disclaimer, the term of this patent is extended or adjusted under 35 U.S.C. 154(b) by 0 days.

(21) Appl. No.: 09/504,154

(22) Filed: Feb. 15, 2000

(51) Int. Cl.[7] .......................................................... B60J 7/22
(52) U.S. Cl. ................................................................ 296/217
(58) Field of Search ................................................. 296/217

(56) References Cited

U.S. PATENT DOCUMENTS

| | | | |
|---|---|---|---|
| 4,342,481 | * | 8/1982 | Kanou et al. ........................ 296/217 |
| 4,362,332 | * | 12/1982 | Garnham ............................. 296/217 |
| 4,681,364 | * | 7/1987 | Bienert et al. ...................... 296/217 |
| 4,971,387 | * | 11/1990 | Bohm et al. ......................... 296/217 |
| 5,971,472 | * | 10/1999 | Schreiter et al. ................... 296/217 |

FOREIGN PATENT DOCUMENTS

| | | | |
|---|---|---|---|
| 3100731 | * | 12/1981 | (DE) ..................................... 296/217 |
| 543498 | * | 6/1955 | (IT) ....................................... 296/217 |

* cited by examiner

*Primary Examiner*—Dennis H. Pedder
(74) *Attorney, Agent, or Firm*—Carlson, Gaskey & Olds

(57) ABSTRACT

A vehicle roof closure assembly is movable between open and closed positions. A wind deflector is biased to an extended position at which it extends vertically upwardly of a forward portion of an aperture. The wind deflector serves to deflect wind away from the cab of a vehicle. However, when the closure member is moved to its closed position, it contacts and forces the wind deflector to a stowed position. The present invention reduces the complexity of wind deflector structures.

10 Claims, 1 Drawing Sheet

SIMPLIFIED WIND DEFLECTOR FOR VEHICLE ROOF CLOSURE

BACKGROUND OF THE INVENTION

This application relates to a wind deflector for a vehicle roof closure wherein the wind deflector is moved between extended and stowed position based upon movement of the closure member.

Modern vehicles are often provided with a closure in the roof which is movable between an open and closed position. These closures are typically known as moon roofs or sunroofs. The closures are selectively moved between the open position at which they open an aperture in the ceiling, or to the closed position at which they close the aperture.

When the closure is the open position, a good deal of wind may move into the cab of the vehicle. Since this wind is often directed at the vehicle occupants, the closures are often provided with wind deflectors forward of the aperture. The wind deflectors serve to direct wind around the wind deflector, such that it is not directed at the occupants of the vehicle.

However, the wind deflectors have also needed to be moved between a stowed position when the closure is closed, and to an extended position when the closure is opened. The movement has presented design challenges.

Known wind deflectors have been relatively complex, and have typically relied upon separate drive members to move between the extended and stowed position. The prior art wind deflectors are thus quite complex.

SUMMARY OF THE INVENTION

In a disclosed embodiment of this invention, a wind deflector is positioned forward in an aperture in a vehicle roof. The wind deflector is biased toward one of a stowed or open position, and moved to the other upon movement of the closure member. In a preferred embodiment, the wind deflector is biased to an extended position at which a deflector portion extends upwardly of the aperture. A spring biases the deflector to this position. The closure member moves against the wind deflector to force it to its stowed position.

Preferably, the wind deflector is mounted within a mount portion such that it has a stop member which stops further movement of the wind deflector when the wind deflector is biased to its extended position. In a preferred embodiment, this stop is provided with a tab extending downwardly from the wind deflector which contacts a portion of the mount. The stop prevents further movement of the wind deflector. In a most preferred embodiment of this invention, the wind deflector is pivotable about a pivot axis, and spring biased about the pivot axis to its extended position. The stop prevents further movement of the wind deflector. The closure member contacts the wind deflector and acts in opposition to the spring bias to force the wind deflector to its stowed position.

These and other features of the present invention can be best understood from the following specification and drawings, the following of which is a brief description.

DETAILED DESCRIPTION OF A PREFERRED EMBODIMENT

Figure 1:
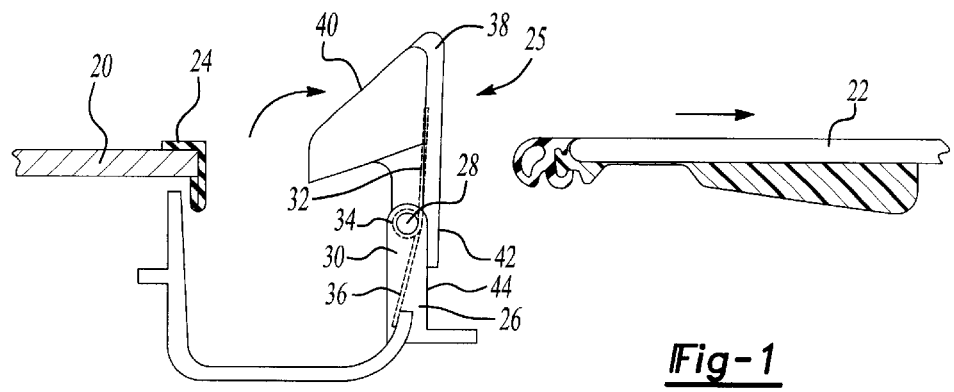
FIG. 1 shows a vehicle roof with a wind deflector in an extended position.

A vehicle roof 20 is illustrated in FIG. 1 having a selectively movable closure 22. As is known, a vehicle operator can selectively move the closure member 22 between open and closed positions. At the closed position, the closure member 22 is positioned in a sealing relationship with a seal 24 adjacent a forward end of an aperture 25.

As shown, a wind deflector mount 26 is positioned adjacent a forward end of the aperture 25. A pivot axis 28 pivotally mounts a spring 30. Spring 30 has a first finger 32, a ring portion 34 mounted about the pivot axis 28 and a second finger 36. First finger 32 abuts a surface of a wind deflector 38. The wind deflector 38 has an aerodynamic front surface 40 which directs wind away from aperture 25 when in its extended position such as illustrated in FIG. 1. A rear stop portion 42 abuts a rear portion of the mount 26 in this position. The spring 30 biases the wind deflector 38 to the position illustrated in FIG. 1. The stop 42 prevents further rotational movement of the wind deflector 38 about the axis 28, as will be explained below.

Figure 2:
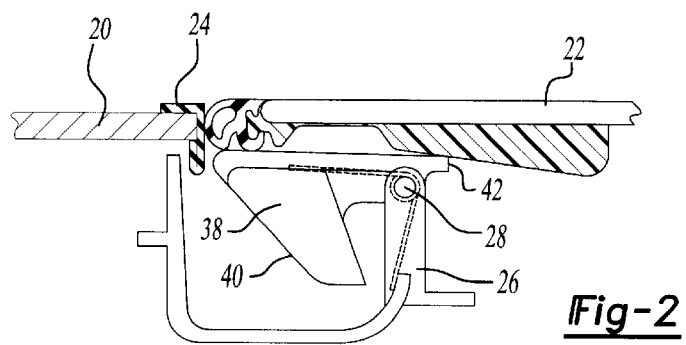
FIG. 2 shows the wind deflector of FIG. 1 having been moved to the stowed position.

As can be seen in FIG. 2, when the closure member 22 is moved forwardly to its closed position, it contacts the wind deflector 28 and forces it against the force of the spring 32 to move to its stowed position. In the stowed position, the wind deflector 38 has pivoted about the pivot axis 28. As shown in FIG. 2, the wind deflector is now stowed. The present invention thus provides a very simple wind deflector structure which does not require a separate motor, or elaborate mounting structure.

Figure 3:
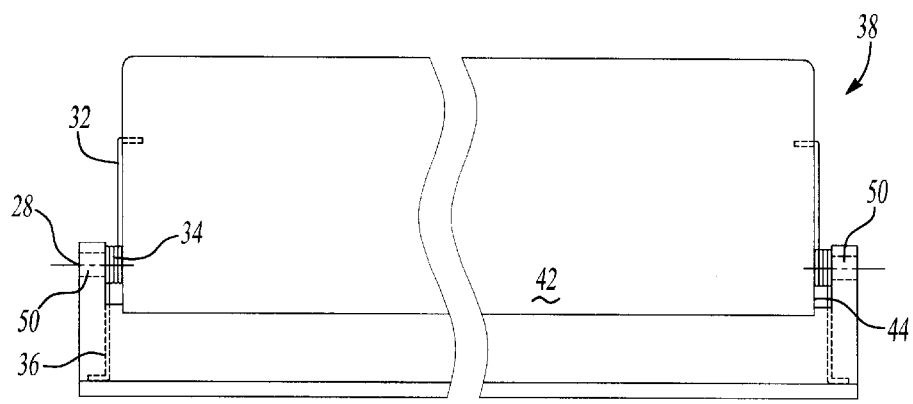
FIG. 3 is a rear view of the inventive wind deflector.

FIG. 3 is a rear view of the wind deflector 38. Pivot arms 50 from deflector are mounted in the mount 26 to define the pivot axis. Ring portion 34 of spring 30 is mounted arms 50. There may be springs 30 at each lateral side, although there may be a single spring. Also, the spring could be mounted in the center of the wind deflector. As can be seen, the stop 42 abuts a lower surface 44 of the mount 26. As can be appreciated, the spring fingers 32 and 36 abut respective surfaces on the wind deflector 38, and mount 26, as illustrated.

As can be appreciated from FIGS. 1–3, the stop 42 is positioned on an opposed side of the pivot axis 28 from the portion of the wind deflector 40 which is positioned above the closure in its extended position. Moreover, the stop 42 is positioned rearward of the pivot axis in the extended position such as is made clear from FIG. 3, while at least a portion of the aerodynamic front surface 40 does extend forward of the pivot axis.

In summary, a very simple wind deflector movement structure is disclosed. The present invention greatly simplifies the mounting and movement of the wind deflector structures.

A preferred embodiment has been disclosed; however, a worker of ordinary skill in this art would recognize that modifications would come within the scope of this invention. For that reason, the following claims should be studied to determine the true scope and content of this invention.

What is claimed is:

1. A vehicle roof comprising:

an aperture;

a roof closure member movable between open and closed positions, and said closure member enclosing said aperture when in said closed position, and exposing said aperture when in said open position;

a wind deflector movable between an extended position and a stowed position, and a portion of said wind deflector extending upwardly above a vertical position of said closure member in said extended position, and said wind deflector moving to said extended position when said closure member is in said open position, said wind deflector being movable to said stowed position, and said wind deflector being biased to at least one of said extended and said stowed position, and movable based upon movement of said closure member to the other of said extended and closed position, said wind deflector being pivotable about an axis in a mount between said extended and stowed positions; and a stop on said wind deflector positioned on an opposed side of said axis from portion of said wind deflector which extends vertically above said closure member, said stop contacting said mount to prevent further rotation of said wind deflector relative to said mount when said wind deflector is in said extended position, said stop being positioned vertically above said pivot axis in said stowed position, but vertically below said pivot axis in said extended position, and also rearward of said pivot axis relative to a forward end of said portion of said wind deflector in said extended position.

2. A vehicle roof as recited in claim 1, wherein said wind deflector is biased to said extended position by a spring mounted on said pivot axis.

3. A vehicle roof as recited in claim 2, wherein said spring has a first finger contacting a portion of said wind deflector and a second finger contacting a portion of said mount.

4. A vehicle roof as recited in claim 1, wherein said wind deflector is biased to said extended position and moved to said stowed position by said closure member as said closure member moves to said closed position.

5. A vehicle roof closure assembly comprising:

a closure member movable between open and closed positions, said closure member opening an aperture in said open position and closing the aperture in said closed position; and a wind deflector mounted to be pivotable between an extended position and a stowed position, said wind deflector being biased to said extended position and being in said extended position when said closure is in said open position, and a portion of said wind deflector extending upwardly above a vertical position of said closure when in said extended position, and said wind deflector being pivotable to a stowed position at which it is below said closure member, said wind deflector being biased toward said extended position by a spring mounted on a pivot axis, said wind deflector being pivotable in a mount, and said spring being mounted on said pivot axis, said wind deflector being entirely vertically below said closure member when in said stowed position, such that said closure contacts a seal in said stowed position, a stop on said wind deflector positioned on an opposed side of said pivot axis from said portion of said wind deflector which extends vertically above said closure member, and stop contacting said mount to prevent further rotation of said wind deflector relative to said mount when said wind deflector is in said extended position.

6. A closure assembly as recited in claim 5, wherein said spring has a first finger contacting a portion of said wind deflector and a second finger contacting a portion of said mount.

7. A closure assembly as recited in claim 5, wherein said wind deflector has a stop surface which contacts a surface of said mount when said wind deflector has been biased to said extended position to prevent further rotational movement of said wind deflector.

8. A vehicle roof closure assembly comprising:

a closure member movable between open and closed positions, said closure member opening an aperture in said open position and closing the aperture in said closed position;

a wind deflector mounted to be pivotable between an extended position and a stowed position, said wind deflector being biased to said extended position and being in said extended position when said closure is in said open position, said wind deflector extending upwardly above a vertical position of said closure when in said extended position, and said wind deflector being pivotable to a stowed position at which it is below said closure member, said wind deflector being biased toward said extended position by a spring mounted on a pivot axis, said wind deflector being pivotable in a mount, and said spring being mounted on said pivot axis, said wind deflector being entirely vertically below said closure member when in said stowed position, such that said closure contacts a seal in said stowed position;

said wind deflector has a stop surface which contacts a surface of said mount when said wind deflector has been biased to said extended position to prevent further rotational movement of said wind deflector; and said mount has mount structures for pivotally mounting said wind deflector, and said stop on said wind deflector contacting a surface laterally between said mount structure to provide said stop.

9. A closure assembly as recited in claim 8, wherein said stop surface on said wind deflector is positioned on an opposed side of said pivot axis from said portion of said wind deflector which extends vertically above said closure member, said stop surface contacting said mount to prevent further rotation of said wind deflector relative to said mount when said wind deflector is in said extended position.

10. A closure assembly as recited in claim 5, wherein said stop is positioned vertically above said pivot axis in said stowed position, but is vertically below said pivot axis in said extended position, and is also rearward of said pivot axis relative to a forward end of said portion of said wind deflector in said extended position.

* * * * *

(12) EX PARTE REEXAMINATION CERTIFICATE (7943rd)

United States Patent
Raasakka et al.

(10) Number: US 6,273,501 C1
(45) Certificate Issued: Dec. 21, 2010

(54) SIMPLIFIED WIND DEFLECTOR FOR VEHICLE ROOF CLOSURE

(75) Inventors: John Raasakka, Howell, MI (US); John E. Long, Highland, MI (US); Roch Tolinski, Howell, MI (US)

(73) Assignee: Meritor Light Vehicle Systems, Inc., Troy, MI (US)

Reexamination Request:
No. 90/008,657, Jul. 23, 2007

Reexamination Certificate for:
Patent No.: 6,273,501
Issued: Aug. 14, 2001
Appl. No.: 09/504,154
Filed: Feb. 15, 2000

(51) Int. Cl.
*B60J 7/22* (2006.01)

(52) U.S. Cl. ...................................... 296/217

(58) Field of Classification Search ................ 296/217
See application file for complete search history.

(56) References Cited

U.S. PATENT DOCUMENTS

| 4,291,912 A | 9/1981 | Fox et al. |
| 4,676,546 A | 6/1987 | Igel |
| 5,513,891 A | 5/1996 | Horiuchi |

FOREIGN PATENT DOCUMENTS

DE 197 32 699 A1 2/1999

*Primary Examiner*—Matthew C. Graham

(57) ABSTRACT

A vehicle roof closure assembly is movable between open and closed positions. A wind deflector is biased to an extended position at which it extends vertically upwardly of a forward portion of an aperture. The wind deflector serves to deflect wind away from the cab of a vehicle. However, when the closure member is moved to its closed position, it contacts and forces the wind deflector to a stowed position. The present invention reduces the complexity of wind deflector structures.

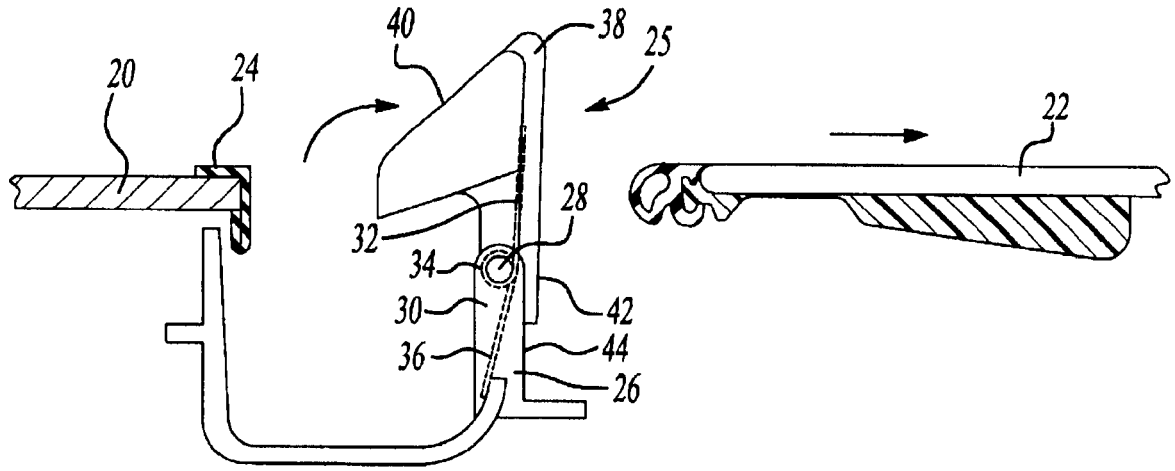

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-10 is confirmed.

New claims 11-16 are added and determined to be patentable.

*11. The vehicle roof as recited in claim 1, wherein said mount is positioned adjacent a forward end of said aperture.*

*12. The vehicle roof as recited in claim 1, wherein said stop contacts a rear portion of said mount.*

*13. The vehicle roof as recited in claim 12, wherein said stop contacts a lower portion of said rear portion of said mount.*

*14. The vehicle roof as recited in claim 1, wherein said wind deflector includes pivot arms that are mounted to said mount.*

*15. The vehicle roof as recited in claim 14, wherein a ring portion of a spring that is mounted on said pivot axis is mounted to said pivot arms.*

*16. The vehicle roof as recited in claim 1, wherein at least a portion of an aerodynamic front surface of said wind deflector extends rearwardly of said pivot axis.*

* * * * *